(12) United States Patent
Yaroslav

(10) Patent No.: US 7,860,914 B2
(45) Date of Patent: Dec. 28, 2010

(54) COMPUTER SYSTEM FOR STORING INFINITE, INFINITESIMAL, AND FINITE QUANTITIES AND EXECUTING ARITHMETICAL OPERATIONS WITH THEM

(76) Inventor: Sergeev Yaroslav, Via Vanni 10, Arcavacata di Rende (IT) I-87036

( * ) Notice: Subject to any disclaimer, the term of this patent is extended or adjusted under 35 U.S.C. 154(b) by 1146 days.

(21) Appl. No.: 11/530,200

(22) Filed: Sep. 8, 2006

(65) Prior Publication Data
US 2008/0126457 A1    May 29, 2008

Related U.S. Application Data

(63) Continuation of application No. PCT/IT2004/000116, filed on Aug. 3, 2004.

(51) Int. Cl.
G06F 7/38        (2006.01)
G06F 13/00     (2006.01)
G06F 13/28     (2006.01)

(52) U.S. Cl. ................ 708/495; 708/513; 711/170; 711/173

(58) Field of Classification Search ............ 708/230, 708/490, 492–493, 495, 513, 518; 711/1–2, 711/5, 117, 170–173
See application file for complete search history.

(56) References Cited

U.S. PATENT DOCUMENTS 5,822,233 A * 10/1998 Kawasaki .............. 708/493
6,658,443 B1    12/2003 Walster

OTHER PUBLICATIONS

Johnstone, P. and Petry, F.E., "Higher radix floating point representations," Proceedings of 9th Symposium on Computer Arithmetic, pp. 128-135, Sep. 1989.*

Baber, R.L., "A Method for Representing Data Items of Unlimited Length in a Computer Memory," IEEE Transactions on Software Engineering, vol. SE-7, No. 6, pp. 590- 593, Nov. 1981.*
Luccio, F., "Variations on a Method for Representing Data Items of Unlimited Length," IEEE Transactions on Software Engineering, vol. SE-11, No. 4, pp. 439- 441, Apr. 1985.*
Beeson et al., "The Meaning of Infinity in Calculus and Computer Algebra Systems," Joint International Conference AISC 2002 and Calculemus 2002, Lecture Notes in Computer Science, vol. 2385, pp. 246-258.
Davies, "Infinity Arithmetic, Comparisons and J," Proceeding of the International Conference on Applied Programming Languages, 1995, pp. 28-34.
Delaplain, "Recursive Syntax Processing," IBM Technical Disclosure Bulletin, 1983, vol. 25, No. 11A, pp. 5486-5487.
Lee et al., "A Microprogrammable List Processor for Personal Computers," IEEE Micro, 1990, pp. 50-61.
Collins, "PM, A System for Polynomial Manipulation," Communications of the ACM, 1966, vol. 9. No. 8. pp. 578-589.
Oda et al., "Polynomial Manipulation in AL-1E," Review of the Electric Communication Laboratories, 1978, vol. 26, Nos. 7-8, pp. 1016-1026.
Sergeyev, Arithmetic of Infinity, Edizioni Orizzonti Meridionali, CS, 2003, pp. 59-97.
International Search Report for PCT/IT2004/000116, dated Nov. 24, 2004.

* cited by examiner

*Primary Examiner*—Chat C Do
*Assistant Examiner*—Matthew Sandifer
(74) *Attorney, Agent, or Firm*—Andriy Lytvyn Smith & Hopen, P.A.

(57) ABSTRACT

In this invention we describe a new type of computer—infinity computer—that is able to operate with infinite, infinitesimal, and finite numbers in such a way that it becomes possible to execute the usual arithmetical operations with all of them. For the new computer it is shown how the memory for storage of these members is organized and how the new arithmetic logic unit (NALU) executing arithmetical operations with them works.

8 Claims, 1 Drawing Sheet

COMPUTER SYSTEM FOR STORING INFINITE, INFINITESIMAL, AND FINITE QUANTITIES AND EXECUTING ARITHMETICAL OPERATIONS WITH THEM

FIELD OF THE INVENTION

The present invention describes a new type of computer which is able to execute arithmetical operations with infinite, infinitesimal, and finite numbers.

BACKGROUND OF THE INVENTION

Problems related to the idea of infinity are among the most fundamental and have attracted the attention of the most brilliant thinkers throughout the whole history of humanity. Numerous trials have been done in order to evolve existing numeral systems and to include infinite and infinitesimal numbers in them. Such eminent researchers as Aristotle, Archimedes, Euclid, Eudoxus, Parmenides, Plato, Pythagoras, Zeno, Cantor, Dedekind, Descartes, Leibniz, Newton, Peano, Cohen, Frege, Gelfond, Gödel, Robinson, and Hilbert worked hard on these topics. To emphasize importance of the subject it is sufficient to mention that the Continuum Hypothesis related to infinity has been included by David Hilbert as the problem number one in his famous list of 23 unsolved mathematical problems that have influenced strongly development of the mathematics in the 20th century.

The point of view on infinity accepted nowadays is based on the ideas of George Cantor who has shown that there exist infinite sets having different number of elements. Particularly, he has shown that the infinite set of natural numbers, N, has less elements than the set, R, of real numbers. There exist different ways to generalize arithmetic for finite numbers to the case of infinite numbers. However, arithmetics developed for infinite numbers are quite different with respect to the arithmetic we are used to deal with (see examples in [1]). Moreover, very often they leave undetermined many operations where infinite numbers take part (for example, infinity minus infinity, infinity divided by infinity, sum of infinitely many items, etc.) or use representation of infinite numbers based on infinite sequences of finite numbers. These crucial difficulties did not allow to people to construct computers that would be able to work with infinite and infinitesimal numbers in the same manner as we are used to do with finite real numbers.

In fact, in modern computers, only arithmetical operations with finite numbers or with intervals having finite numbers as their limits (see, for example [2]) are realized. Traditional real numbers can be represented in computer systems in various ways. Many of them use positional numeral systems with the finite radix b. Note that numeral is a symbol or group of symbols that represents a number. The difference between numerals and numbers is the same as the difference between words and the things they refer to. A number is a concept that a numeral expresses. The same number can be represented by different numerals. For example, the symbols '3', 'three', and 'III' are different numerals, but they all represent the same number.

In positional numeral systems fractional numbers are expressed by the record $$(a_n a_{n-1} \ldots a_1 a_0 . a_{-1} a_{-2} \ldots a_{-(q-1)} a_{-q})_b \qquad (1)$$

where numerals $a_i$, $-q \leq i \leq n$, are called digits, belong to the alphabet $\{0, 1, \ldots, b-1\}$, and the dot is used to separate the fractional part from the integer one. Thus, the numeral (1) is equal to the sum $$a_n b^n + a_{n-1} b^{n-1} + \ldots + a_1 b^1 + a_0 b^0 + a_{-1} b^{-1} + \ldots + a_{-(q-1)} b^{-(q-1)} + a_{-q} b^{-q} \qquad (2)$$

In modern computers, the radix $b=2$ with the alphabet $\{0, 1\}$ is mainly used to represent numbers. There exist numerous ways to represent and to store numbers in computers. Particularly, a floating-point representation expresses a number in four parts: a sign, a mantissa, a radix, and an exponent. The sign is either a 1 or −1. The mantissa, always a positive number, holds the significant digits of the floating-point number. The exponent indicates the positive or negative power of the radix that the mantissa and sign should be multiplied by.

SUMMARY OF THE INVENTION

In this invention we describe a new type of computer—infinity computer—that is able to operate with infinite, infinitesimal, and finite numbers in such a way that it becomes possible to execute the usual arithmetical operations with all of them. For the new computer it is shown how the memory for storage of these numbers is organized and how the new arithmetic logic unit (NALU) executing arithmetical operations with them works.

Figure 1:
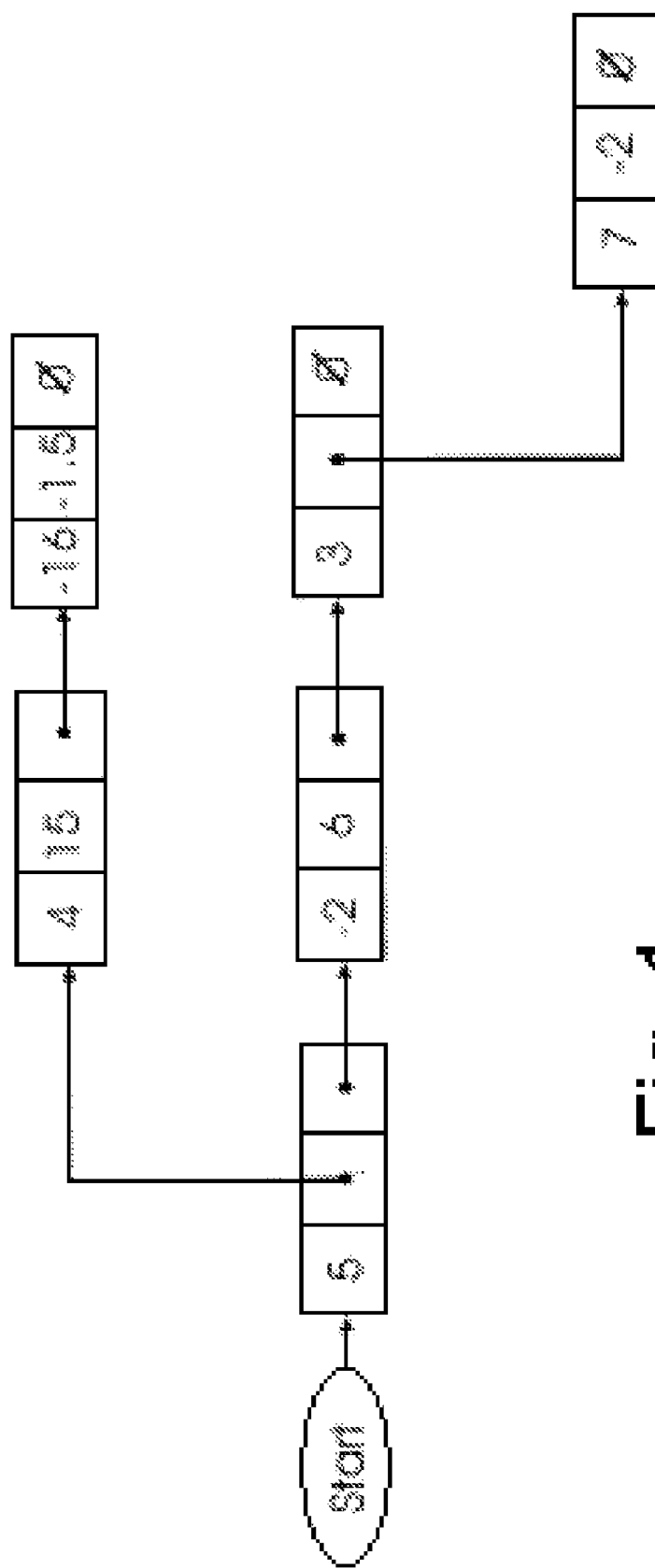
FIG. 1 shows a tree data structure representing the flowing infinite number $$C = 5\square^{4\square^{15}(-16)\square^{-1.5}} (-2)\square^6 3\square^{7\square^{-1}}.$$

This number has 3 parts, i.e., $L=L(C)=3$ in the form (16). The first grossdigit is 5 and it corresponds to the grosspower $4\square^{15}(-16)\square^{-1.5}$ being an infinite number which we call A. Since A in infinite, there is a pointer to its location in the memory shown in FIG. 1 by the arrow →. In its turn, A consists of two parts, i.e., $L(A)=2$, and all its grossdigits and grosspowers are finite. The symbol ø shows that there are no other pointers in a number representation. The arrow links the first part of the number C to the second one.

The second part, $-2\square^6$, of the number C has both grossdigit and grosspower finite and they are stored in the corresponding registers. The third part, $3\square^{7\square^{-2}}$, of the number C has the pointer to its infinite grosspower $7\square^{-2}$ which, in its turn, has both grossdigit and grosspower finite.

DESCRIPTION OF THE INVENTION

In this invention we describe a new type of computer—infinity computer—that is able to operate with infinite, infinitesimal, and finite numbers in such a way that it becomes possible to execute the usual arithmetical operations with all of them. For the new computer it is shown how the memory for storage of these numbers is organized and how the new arithmetic logic unit (NALU) executing arithmetical operations with them works.

In order to describe the infinity computer able to work with infinite, infinitesimal, and finite numbers we proceed as follows. First, we introduce a new positional system with infinite base allowing us to write down not only finite but infinite and infinitesimal numbers too. Second, we describe arithmetical operations for all of them. Third, we explain how the computer memory is organized to store these numbers. Fourth, we describe the NALU for operating with infinite, infinitesimal, and finite numbers.

The infinite radix of the new positional numeral system is introduced as an infinite number $\square$ defined by the following axioms:

(i) For any finite natural number n it follows n<①.
(ii) The following relations link ① to identity elements 0 and 1

$$0 \cdot ① = ① \cdot 0 = 0, \; ① - ① = 0, \; \frac{①}{①} = 1, \; ①^0 = 1, \; 1^① = 1. \quad (3)$$

(iii) For any finite natural n the number ①/n is defined as the nth part of ①.

Examples of mathematical objects that can be taken as the radix ①: the number of elements of the set of natural numbers (see [1]), the number of elements of the set of integer numbers, the number of elements of the set of odd numbers. Note that the axioms (i)-(iii) added to the axioms of real numbers describe a class of new mathematical objects allowing to consider the process of operating with infinite numbers in a way different from the traditional one where $\infty+\infty=\infty$. Theories where $\infty+\infty\neq\infty$ are studied in the field of mathematics called non-standard analysis.

In order to fix our arithmetic, we suppose hereinafter without loss of generality that ① is the number of elements of the set of natural numbers. Then, due to the axiom (iii) the number ①/n is defined as the number of elements of the nth part of the set, N, of natural numbers where its nth parts are determined as the following sets $$N_n = \{k, k+n, k+2n, k+3n, \ldots\}, \; 1 \leq k \leq n.$$

It is important to emphasize that to introduce ①/n we do not try to count elements $k, k+n, k+2n, k+3n, \ldots$. In fact, we cannot do it since our possibilities to count are limited and, therefore, we are not able to count for infinity. In contrast, we postulate (in order to have the situation occurring in finite sets) that the infinite number of elements of the nth part of the set, i.e., ①/n, is n times less than the number of elements of the whole set, i.e., than ①. Note also that, since ①/n has been introduced as the number of elements of a set, it is an integer number. This axiomatization means, for example, that the sets of even and odd numbers have ①/2 elements each and the set of natural numbers, N, being the union of these two sets, has ①/2+①/2=① elements.

The axioms (i)-(iii) are added to the axioms of real numbers and, therefore, it is possible to operate with ① as with a usual finite number. For example, it is possible to define the following infinite numbers that can also be interpreted in the terms of sets of finite numbers: ①−2 is defined as the number of elements of the set of natural numbers, N, from which two any numbers have been taken out; ①+3 as the number of elements of the set N∪{a, b, c} where numbers a, b, c∉N; and ①² as the number of elements of the set N×N.

Numbers obtained in such a way can be ordered. In our example, we have ①−2<①<①+3<①². Let us show, for instance, that ①<①². We can write the difference $$①^2 - ① = ①(① - 1) \quad (4)$$

Due to (i), ① is greater than any finite natural number, therefore ①>1 and as a consequence ①−1>0. It follows from this inequality and (4) that the number ①²−① is a positive number and, therefore, ①²>①.

To express infinite and infinitesimal numbers we shall use records that are similar to (1) and (2) but have some peculiarities. In order to construct a number C in the new numeral positional system with base ① we subdivide C into groups corresponding to powers of ①:

$$C = c_{p_m}①^{p_m} + \ldots + c_{p_1}①^{p_1} + c_{p_0}①^{p_0} + c_{p_{-1}}①^{p_{-1}} + \ldots + c_{p_{-k}}①^{p_{-k}} \quad (5)$$

Then, the record $$C = c_{p_m}①^{p_m} \ldots c_{p_1}①^{p_1} c_{p_0}①^{p_0} c_{p_{-1}}①^{p_{-1}} \ldots c_{p_{-k}}①^{p_{-k}} \quad (6)$$

represents the number C, symbols $c_i$ are called infinite grossdigits, symbols $p_i$ are called grosspowers. The numbers $p_i$ are such that $p_i>0$, $p_0=0$, $p_{-i}<0$ and $$p_m > p_{m-1} < \ldots > p_2 > p_1 > p_{-1} > p_{-2} > \ldots > p_{-(k-1)} > p_{-k}.$$

In the traditional record (1) there exists a convention that a digit $a_i$ shows how many powers $b^i$ are present in the number and the radix b is not written explicitly. In the record (6) we write $①^{p_i}$ explicitly because in the new numeral positional system the number i in general is not equal to the grosspower $p_i$. This gives possibility to write, for example, such numbers as $7①^{244.5}3①^{-32}$ where $p_1=244.5$, $p_{-1}=-32$.

Finite numbers in this new numeral system are represented by numerals having only one grosspower equal to zero. In fact, if we have a number C such that m=k=0 in representation (6), then due to (3) we have $C=c_0①^0=c_0$. Thus, the number C in this case does not contain infinite units and is equal to the grossdigit $c_0$ which being a conventional finite number can be expressed in the form (1), (2) by any positional system with finite base b (or by another numeral system). It is important to emphasize that the grossdigit $c_0$ can be integer or fractional and can be expressed by a few symbols in contrast to the traditional record (1) where each digit is integer and is represented by one symbol from the alphabet $\{0, 1, 2, \ldots, b-1\}$. Thus, the grossdigit $c_0$ shows how many finite units and/or parts of the finite unit, $1=①^0$, there are in the number C. Grossdigits can be written in positional systems, in the form p/q where p and q are integer numbers, or in any other finite numeral system.

Analogously, in the general case, all grossdigits $c_i$, $-k \leq i \leq m$, can be integer or fractional and expressed by many symbols. For example, the number $7/3①^484/19①^{-3.1}$ has grossdigits $c_4=7/3$ and $c_{-3.1}=84/19$. All grossdigits show how many corresponding units take part in the number C and it is not important whether this unit is finite or infinite.

Infinite numbers are written in this numeral system as numerals having grosspowers greater than zero, for example $7①^{244.5}3①^{-32}$ and $-2①^{743}3①^{037} ①^{-2}11①^{-15}$ are infinite numbers. In the following example the left-hand expression presents the way to write down infinite numbers and the right-hand shows how the value of the number is calculated:

$$15①^{14}17.2045①^352.1①^{-6} = 15①^{14} + 17.2045①^3 + 52.1①^{-6}.$$

If a grossdigit $c_{p_i}$ is equal to 1 then we write $①^{p_i}$ instead of $1①^{p_i}$. Analogously, if power $①^0$ is the lowest in a number then we often use simply the corresponding grossdigit $c_0$ without $①^0$, for instance, we write $23①^{14}5$ instead of $23①^{14}5①^0$ or 3 instead of $3①^0$.

Numerals having only-negative grosspowers represent infinitesimal numbers. The simplest number from this group is $①^{-1}=1/①$ being the inverse element with respect to multiplication for ①:

$$\frac{1}{①} \cdot ① = ① \cdot \frac{1}{①} = 1. \quad (7)$$

Note that all infinitesimals are not equal to zero. Inverse elements of more complex numbers including grosspowers of ① are defined by a complete analogy. The following two numbers are examples of infinitesimals $3①^{-32}$, $37①^{-2}11①^{-15}$.

The above examples show how we can write down infinite numbers with all grossdigits being finite numbers. Let us see now how we can express a number including infinite grossdigits. The number $$-14①^2(0.5①+3)①^1(①-4.5)①^{-1} \quad (8)$$

has m=2, k=1, and the following grossdigits $$c_2=-14, c_1=0.5①+3, c_{-1}=①-4.5,$$

where $c_2$ is finite and $c_1$, $c_{-1}$ are infinite. The record (8) is correct but not very elegant because the system base ① appears in the expressions of grossdigits. In order to overcome this unpleasantness and to introduce a more simple structure of infinite numerals, we rewrite the number (8) in the explicit form (5)

$$-14①^2(0.5①+3)①^1(①-4.5)①^{-1}=-14①^2+(0.5①+3)①^1+(①-4.5)①^{-1}.$$

Then we open the parenthesis, collect the items having the same powers of ① (taking into account that ①①$^{-1}$=①$^0$), and finally obtain $$\begin{aligned}-14①^2+(0.5①+3)①^1 \\ (①-4.5)①^{-1} \end{aligned} = -14①^2 +0.5①^2+3①^1+①①^{-1}-4.5①^{-1} \quad (9)$$

$$= 13.5①^2+3①^1+①^0-4.5①^{-1}$$

$$= -13.5①^2 3①^1 ①^0 (-4.5)①^{-1}.$$

As can be seen from the record (9), there are no infinite grossdigits in it but negative grossdigits have appeared. Since the record (8) using infinite grossdigits (called hereinafter record of the type 1) is more cumbersome, we introduce the notion of finite grossdigit as a finite number $c_i$ expressed by a finite number of symbols in a numeral system and showing how many infinite units of the type ①$^{k_i}$, $-k \leq i \leq m$, should be added or subtracted in order to compose infinite numbers. The record (9) using finite grossdigits is called record of the type 2 and, since it is more flexible than the record of the type 1, it will be mainly used hereinafter to express infinite numbers.

Let us now introduce arithmetical operations for infinite, infinitesimal, and finite numbers to be used in the infinity computer. The operation of addition of two given infinite numbers A and B returns as the result an infinite number C constructed as follows (the operation of subtraction is a direct consequence of that of addition and is thus omitted). The numbers A, B, and their sum C are represented in the record of the type 2:

$$A=\sum_{i=1}^{K} a_{k_i} ①^{k_i}, \quad B=\sum_{j=1}^{M} b_{mj} ①^{mj}, \quad C=\sum_{i=1}^{L} c_{l_i} ①^{l_i}. \quad (10)$$

Then the result C is constructed (see Example 1) by including in it all items $a_{k_i}①^{k_i}$ from A such that $k_i \neq m_j$, $1 \leq j \leq M$, and all items $b_{mj}①^{mj}$ from B such that $m_j \neq k_i$, $1 \leq i \leq K$. If in A and B there are items such that $k_i=m_j$ for some i and j then this grosspower $k_i$ is included in C with the grossdigit $b_{k_i}+a_{k_i}$, i.e., as $(b_{k_i}+a_{k_i})①^{k_i}$. It can be seen from this definition that the introduced operation enjoys the usual properties of commutativity and associativity due to definition of grossdigits and the fact that addition for each grosspower of ① is executed separately.

The operation of multiplication of two given infinite numbers A and B from (10) returns as the result the infinite number C constructed as follows (see Example 2).

$$C=\sum_{j=1}^{M} C_j, \quad C_j=b_{mj}①^{mj}, \quad A=\sum_{i=1}^{K} a_{k_i}b_{mj}①^{k_i+mj}, \quad (11)$$

$$1 \leq j \leq M.$$

Similarly to addition, the introduced multiplication is commutative and associative. It is easy to show that the distributive property is also valid for these operations.

In the operation of division of a given infinite number C by an infinite number B we obtain an infinite number A and a reminder R that can be also equal to zero, i.e., C=A·B+R.

The number A is constructed as follows (see Example 3). The numbers B and C are represented in the form (10). The first grossdigit $a_{k_K}$ and the corresponding maximal exponent $k_K$ are established from the equalities $$a_{k_K}=c_{l_L}/b_{m_M}, \quad k_K=l_L-m_M \quad (12)$$

Then the first partial reminder $R_1$ is calculated as $$R_1=C-a_{k_K}①^{k_K} \cdot B \quad (13)$$

If $R_1 \neq 0$ then the number C is substituted by $R_1$ and the process is repeated by a complete analogy. The grossdigit $a_{k_{K-i}}$, the corresponding grosspower $k_{K-1}$ and the partial reminder $R_{i+1}$ are computed by formulae (14) and (15) obtained from (12) and (13) as follows: $l_L$ and $c_{l_L}$ are substituted by the highest grosspower $n_i$ and the corresponding grossdigit $r_{n_i}$ of the partial reminder $R_i$ that in its turn substituted C:

$$a_{k_{K-1}}=r_{n_1}/b_{m_M}, \quad k_{K-i}=n_i-m_M \quad (14)$$

$$R_{i+1}=R_i-a_{k_{K-i}}①^{k_{K-1}} \cdot B, \quad i \geq 1 \quad (15)$$

The process stops when a partial reminder equal to zero is found (this means that the final reminder R=0) or when a required accuracy of the result is reached.

Now we are ready to present the infinity computer itself. It differs from traditional computers by its ability to store and elaborate infinite, infinitesimal, and finite numbers. We start by describing how its memory unit is organized.

The infinity computer has a special memory to store infinite, infinitesimal, and finite numbers where the following three rules of storage are fixed: (i) for the radix, ①, of the infinite positional system; (ii) for grossdigits; (iii) for grosspowers. Hereinafter we suppose that infinity computer works with a base-two representation of grossdigits and grosspowers, however, the whole discussion holds for computing systems using any radix for storage of finite numbers.

The radix, ①, of the infinite positional system is not stored. Its meaning (for example, assumption that ① is the number of elements of the set of even numbers or the number of elements of the set of natural numbers) is a convention for realization and usage of the infinity computer.

Every infinite, infinitesimal, or finite number $$C=c_L①^{p_L}+\ldots+c_1①^{p_1}, p_L> \ldots >p_1, \quad (16)$$

is represented by a set of 2L registers for storage grossdigits and grosspowers. Each ith part $c_i①^{p_i}$, $1 \leq i \leq L$, of the number C is represented by two registers (for example, with floating-point having single or higher precision): the first one for the grossdigit $c_i$ and the second for the grosspower $p_i$. Registers representing the parts $c_i\square^{p_i}$ of the number C are linked by pointers. If the number C contains m positive grosspowers, k negative grosspowers, and the grosspower equal to zero, then L registers used to store grossdigits are related to the L corresponding registers used to store grosspowers: m for the grossdigits corresponding to positive grosspowers, k corresponding to negative grosspowers, and one register corresponding to the grosspower equal to zero if it is present in the number.

If a grosspower $p_i$ is itself an infinite number A, then the register of this grosspower contains the pointer to the address where the number A is stored in the same manner as the number C. If the number A has again an infinite grosspower $A_1$, we again put in the register corresponding to this grosspower a pointer to the address where the number $A_1$ is stored. The obtained claims of pointers finish when all finite grosspowers are found. By using the terminology of data structures, we can say that as the result, the number C is represented by a tree with branches being pointers and leafs being grosspowers and grossdigits. An example of such a data structure is shown in FIG. 1.

The record of the type 2 for writing down infinite numbers (see definition at p. 8) ensures that all grossdigits are finite. In the case of the record of the type 1 (see definition at p. 7), not only grosspowers $p_i$ but also grossdigits $c_i$ can be infinite numbers. If this is the case and a grossdigit $c_i$ is an infinite number B, then the register of $c_i$ contains the pointer to the address where the number B is stored in the same manner as the number C.

Infinitesimal numbers are stored analogously. The only difference with infinite numbers is in the fact that infinitesimal numbers do not contain grosspowers greater or equal to zero. Finite numbers are stored in the same manner but they contain only one grossdigit corresponding to the grosspower equal to zero. Other grosspowers and grossdigits are absent in the record and, therefore, only two registers are sufficient to store finite numbers: the first one contains the grossdigit and the second register responsible for the corresponding grosspower contains zero.

In traditional computers every number r is represented by a string of digits and the maximal length of this string allowed us by the computer gives boundaries for representation of the numbers, i.e., minimal and maximal absolute values, $\gamma$ and $\Gamma$, such that $\gamma \leq |r| \leq \Gamma$. In the infinity computers only finite grossdigits and grosspowers being leafs in the tree data structure are represented by strings of digits and, therefore, are also such that $\gamma \leq |r| \leq \Gamma$. However, if one needs to express, for example, a value greater than $\Gamma\square^\Gamma$, it is sufficient to substitute the finite value $\Gamma$ in the grosspower position by an infinite number, for instance, by $\square$. Thus, since $\square < \Gamma$, the resulting number $\Gamma\square^\square > \Gamma\square^\Gamma$. In general, when it is necessary to obtain greater (or smaller) quantities, the strings representing finite grossdigits or grosspowers can be substituted by pointers to new infinite (or infinitesimal) numbers.

In each concrete technical realization of the infinity computer we can represent a finite number M of infinite, infinitesimal, and finite numbers. The number M can be increased by enlarging the memory of the computer and by augmenting the length of the string of digits for representation of finite grossdigits and grosspowers.

In order to execute arithmetical operations with infinite, infinitesimal, and finite numbers the infinity computer uses the NALU which is different from that of classical computers. The NALU works with numbers of the form (16) by executing arithmetical operations-introduced above. It consists of a control unit (CU), an internal memory unit (IMU) for storage intermediate results, and traditional ALUs (TALUs) working as low level tools inside the NALU and executing usual arithmetical operations only with finite numbers.

During every arithmetical operation the NALU reads numbers (16) from external memory to its IMU. Then, it decomposes the operands in finite grossdigits and the corresponding finite grosspowers using, if necessary, chains of pointers leading to final finite numbers (see the description of the memory unit above). Then the NALU calculates intermediate results and the final result according to the introduced operations: addition and subtraction by formula (10), multiplication by (10), (11), division by (10),(12)-(15). In order to execute these operations with infinite, infinitesimal, or finite numbers the NALU uses TALUs as follows.

The CU sends the operands (i.e., finite grossdigits and grosspowers) obtained after decomposition to TALUs and communicates to them which standard low level operations (i.e., operation of addition, subtraction, multiplication, or division with standard finite operands) should be executed with the send operands in order to realize one of the required operations (10)-(15). When a TALU has calculated a result of the required operation, it sends it back to the CU which receives it and writes in the corresponding register of the IMU (i.e., as a grossdigit or as a grosspower) of the infinite number. This process of communications between the CU, IMU, and TALUs continues until the IMU will contain all grossdigits and grosspowers of the infinite result. Then, it the obtained number is the final result, the NALU stores it in the external memory, otherwise it is used as an intermediate result in further calculations.

The following two special situations can occur when TALUs calculate results of arithmetic operations with finite numbers. First, a TALU can obtain zero as the value of a grossdigit, i.e., $a_i=0$ for a term $a_i\square^{p_i}$. Then, the CU does not store the corresponding term $a_i\square^{p_i}$. Second, the underflow or overflow situations during calculating finite grossdigits or grosspowers hold. In this case the CU sends a message to the user describing the event and the user (or the compiler) makes a decision about elaboration of the situation.

The introduced new memory and the NALU can be used in different ways in computer systems with various architectures, for example, in the following forms: single processor computers, parallel computers, distributed computer systems, single processor quantum computers, parallel and distributed quantum computers.

EXAMPLES

1. Addition. In order to simplify the presentation, the radix b=10 is used for writing down grossdigits. We consider two infinite numbers A and B where $$A=16.5\square^{44.2}(-12)\square^{12}17\square^0 1.17\square^{-3},$$

$$B=23\square^{14} 6.23\square^3 10.1\square^0(-1.17)\square^{-3}11\square^{-43}.$$

Their sum C is calculated as follows $$C=A+B=16.5\square^{44.2}+(-12)\square^{12}+17\square^0+1.17\square^{-3}+ 23\square^{14}+6.23\square^3+10.1\square^0-1.17\square^{-3}+11\square^{-43}= 16.5\square^{44.2}+23\square^{14}-12\square^{12}+6.23\square^3+(17+10.1)\square^0+(1.17-1.17)\square^{-3}+11\square^{-43}=16.5\square^{44.2}+ 23\square^{14}-12\square^{12}+6.23\square^3+27.1\square^0+11\square^{-43}= 16.5\square^{44.2}23\square^{14}(-12)\square^{12}6.23\square^3 27.1\square^0 11\square^{-43}.$$

2. Multiplication. We consider two infinite numbers $$A=\square^{18}(-5)\square^2(-3)\square^1 0.2, B=\square^2(-1)\square^1 7\square^{-3}$$

and calculate the product $C=B \cdot A$. The first partial product $C_1$ is equal to $$C_1 = 7□^{-3} \cdot A = 7□^{-3}(□^{18}-5□^2-3□^1+0.2) =$$
$$7□^{15}-35□^{-1}-21□^{-2}+1.4□^{-3} =$$
$$7□^{15}(-35)□^{-1}(-21)□^{-2}1.4□^{-3}.$$

The other two partial products, $C_2$ and $C_3$, are computed analogously:

$$C_2 = -□^1 \cdot A = -□^1(□^{18}-5□^2-3□^1+0.2) = -□^{19}5□^3 3□^2 (-0.2)□^1,$$

$$C_3 = □^2 \cdot A = □^2(□^{18}-5□^2-3□^1+0.2) = □^{20}(-5)□^4(-3)□^3 0.2□^2.$$

Finally, by taking into account that grosspowers $□^3$ and $□^2$ belong to both $C_2$ and $C_3$ and, therefore, it is necessary to sum up the corresponding grossdigits, the product $C$ is equal (due to its length, the number $C$ is written in two lines) to $$C = C_1 + C_2 + C_3 = □^{20}(-1)□^{19}7□^{15}(-5)□^4 2□^3 3.2□^2 (-0.2)□^1(-35)□^{-1}(-21)□^{-2}1.4□^{-3}.$$

3. Division. In the first example we divide the number $\tilde{C} = -10□^3 16□^0 42□^{-3}$ by the number $B = 5□^3 7$. For these numbers we have $$l_L = 3, m_M = 3, c_{l_L} = -10, b_{m_M} = 5.$$

It follows immediate from (12) that $a_{k_K}□^{k_K} = -2□^0$. The first partial reminder $R_1$ is calculated as $$R_1 = -10□^3 16□^0 42□^{-3} - (-2□^0) \cdot 5□^3 7$$
$$= -10□^3 16□^0 42□^{-3} + 10□^3 14□^0$$
$$= 30□^0 42□^{-3}.$$

By a complete analogy we should construct $a_{k_{K-1}}□^{k_{K-1}}$ by rewriting (12) for $R_1$. By doing so we obtain equalities $$30 = a_{k_{K-1}} \cdot 5, \quad 0 = k_{K-1} + 3$$

and, as the result, $a_{k_{K-1}}□^{k_{K-1}} = 6□^{-3}$. The second partial reminder is $$R_2 = R_1 - 6□^{-3} \cdot 5□^3 7 = 30□^0 42□^{-3} - 30□^0 42□^{-3} = 0.$$

Thus, we can conclude that the reminder $R = R_2 = 0$ and the final result of division is $A = -2□^0 6□^{-3}$.

Let us now substitute the grossdigit 42 by 40 in $C$ and divide this new number $\tilde{C} = -10□^3 16□^0 40□^{-3}$ by the same number $B = 5□^3 7$. This operation gives us the same result $\tilde{A}_2 = A = -2□^0 6□^{-3}$ (where subscript 2 indicates that two partial reminders have been obtained) but with the reminder $\tilde{R} = \tilde{R}_2 = -2□^{-3}$. Thus, we obtain $\tilde{C} = B \cdot \tilde{A}_2 + \tilde{R}_2$. It we want to continue the procedure of division, we obtain $\tilde{A}_3 = -2□^0 6□^{-3}(-0.4)□^{-6}$ with the reminder $\tilde{R}_3 = 0.28□^{-6}$. Naturally, it follows $\tilde{C} = B \cdot \tilde{A}_3 + \tilde{R}_3$. The process continues until a partial reminder $\tilde{R}_1 = 0$ is found or when a required accuracy of the result will be reached.

REFERENCES

[1] Ya. D. Sergeyev, *Arithmetic of infinity*, Edizioni Orizzonti Meridionali, C S, 2003.

[2] G. W. Walster, *Method and apparatus for representing arithmetic intervals with a computer system*, U.S. Pat. No. 6,658,443 B1, 2003.

I claim:

1. A computer system comprising:
   memory units configured to store infinite, infinitesimal, and finite numbers;
   new arithmetical logical units (NALU) configured to execute arithmetical operations with said infinite, infinitesimal, and finite numbers;
   wherein said infinite, infinitesimal, and finite numbers are of a form $$C = c_L□^{p_L} + \ldots + c_1□^{p_1}, \; p_L > \ldots > p_1 \qquad (16)$$

wherein $C$ represents an infinite, infinitesimal, or finite number, radices $□$ represent infinite numbers, symbols $c_i$ represent grossdigits, and symbols $p_i$ represent grosspowers, and $1 \leq i \leq L$;
   wherein each said grossdigit $c_i$ is an infinite number of said form 16, an infinitesimal number of said form 16, or a finite number of said form 16, and each said grosspower $p_i$ is an infinite number of said form 16, an infinitesimal number of said form 16, or a finite number of said form 16;
   said memory units storing said number $C$ of said form 16 by utilizing at least a first series of registers and at least a second series of registers;
   said first series of registers storing said grossdigits $c_i$, said second series of registers storing said grosspowers $p_i$;
   said first series of registers being linked to said second series of registers by pointers;
   said first series of registers containing a pointer to an address for each infinite or infinitesimal grossdigit, wherein each said infinite or infinitesimal grossdigit is of said form 16 and is stored in said memory units in the same manner as said number $C$; and
   said second series of registers containing a pointer to an address for each infinite or infinitesimal grosspower, wherein each said infinite or infinitesimal grosspower is of said form 16 and is stored in said memory units in the same manner as said number $C$.

2. A computer system of claim 1 wherein said NALU comprises:
   a control unit governing processes in said NALU and communication of said NALU with other systems of said computer system;
   an internal memory unit for storing intermediate results; and
   traditional arithmetical logical units working as low-level tools inside said NALU and executing arithmetical operations with only finite numbers.

3. A computer system of claim 2 realized completely either as hardware or as a combination of software and hardware.

4. A computer system of claim 2 built in the form selected from the group consisting of single processor computers, parallel computers, distributed computer systems, single processor quantum computers, and a combination of parallel and distributed quantum computers.

5. A method of performing arithmetic operations with infinite, infinitesimal, and finite numbers used by a computer system comprising the steps of:
   receiving at least two independently infinite, infinitesimal, or finite numbers;
   reading said independently infinite, infinitesimal, or finite numbers to an internal memory unit as at least a first operand A and at least a second operand B;
   decomposing said first operand A and said second operand B into finite grossdigits, corresponding finite grosspowers, and chains of pointers leading to final finite numbers;

performing arithmetic operations with said first operand A and said second operand B;
calculating a result C using new arithmetical logical units (NALU);
wherein said first operand A, said second operand B, and said result C are independently infinite, infinitesimal, or finite numbers having forms $$A = \sum_{i=1}^{K} a_{k_i} \square^{k_i}, \quad B = \sum_{j=1}^{M} b_{mj} \square^{mj}, \quad C = \sum_{i=1}^{L} c_{1_i} \square^{1_i}. \quad (10)$$

wherein radices represent infinite numbers, symbols $a_{ki}$, $b_{mj}$, $c_{li}$ represent grossdigits, and symbols $k_i$, $m_j$, and $l_i$ represent grosspowers;
using low-level arithmetical logical units for execution of traditional arithmetic operations with finite numbers;
wherein said computer system further comprises:
memory units configured to store infinite, infinitesimal, and finite numbers;
said NALU configured to execute arithmetical operations with said infinite, infinitesimal, and finite numbers;
wherein said infinite, infinitesimal, and finite numbers are of a form $$N = d_L \square^{p_L} + \ldots + d_1 \square^{p_1}, p_L > \ldots > p_1 \quad (16a)$$

wherein N represents an infinite, infinitesimal, or finite number, radices $\square$ represent infinite numbers, symbols $d_i$ represent grossdigits, and symbols $p_i$ represent grosspowers, and $1 \leq i \leq L$;
wherein each said grossdigit $d_i$ is an infinite number of said form 16a, an infinitesimal number of said form 16a, or a finite number of said form 16a, and each said grosspower $p_i$ is an infinite number of said form 16a, an infinitesimal number of said form 16a, or a finite number of said form 16a;
said memory units storing said number N of said form 16a by utilizing at least a first series of registers and at least a second series of registers;
said first series of registers storing said grossdigits $d_i$, said second series of registers storing said grosspowers $p_i$;
said first series of registers being linked to said second series of registers by pointers;
said first series of registers containing a pointer to an address for each infinite or infinitesimal grossdigit, wherein each said infinite or infinitesimal grossdigit is of said form 16a and is stored in said memory units in the same manner as said number N;
said second series of registers containing a pointer to an address for each infinite or infinitesimal grosspower, wherein each said infinite or infinitesimal grosspower is of said form 16a and is stored in said memory units in the same manner as said number N;

wherein said NALU comprises:
a control unit governing processes in said NALU and communication of said NALU with other systems of said computer system;
said internal memory unit for storing intermediate results; and
said traditional arithmetical logical units working as low-level tools inside said NALU and executing arithmetical operations with only finite numbers.

6. A method of performing arithmetic operations with infinite, infinitesimal, and finite numbers of claim 5 wherein said arithmetic operation is addition comprising the steps of:
receiving at least said first operand A and at least said second operand B;
including in said result C all terms $a_{ki}\square^{ki}$ of said first operand A, for which $m_j \neq k_i$ and $1 \leq j \leq M$;
including in said result C all terms $b_{mj}\square^{mj}$ of said second operand B, for which $m_j \neq k_i$ and $1 \leq i \leq K$; and
including in said result C a term $(b_{ki} + a_{ki})\square^{ki}$ when $m_j = k_i$.

7. A method of performing arithmetic operations with infinite, infinitesimal, and finite numbers of claim 5 wherein said arithmetic operation is multiplication comprising the steps of:
receiving at least said first operand A and at least said second operand B;
calculating said grosspowers $l_i$ of said result C by adding every said grosspower $k_i$ of said first operand A and every said grosspower $m_j$ of said second operand B;
calculating said grossdigits $c_{li}$ of said result C by multiplying every said grossdigit $a_{ki}$ of said first operand A by every said grossdigit $b_{mj}$ of said second operand B; and
obtaining said result C by representing it in said form 10 using said radices, said grosspowers $l_i$ and said grossdigits $c_{li}$.

8. A method of performing arithmetic operations with infinite, infinitesimal, and finite numbers of claim 5 wherein said arithmetic operation is division comprising the steps of:
receiving at least said first operand A and at least said second operand B;
assigning 0 as initial value of i;
obtaining a grossdigit $c_{lL-i}$ of said result C by division of a first gross digit $a_{kK}$ of said first operand A by a first grossdigit $b_{mM}$ of said second operand B;
obtaining a respective maximal grosspower $l_{L-i}$ of said result C by subtracting a maximal grosspower $m_M$ of said second operand B from a maximal grosspower $k_K$ of said first operand A;
obtaining a partial remainder $R_i$ using an equation $R_i = A - c_{lL}\square_{lL} \cdot B$
assigning $R_i$ as new said first operand A;
increasing the current value of i by 1; and
obtaining subsequent grossdigits $c_{lL-i}$ and grosspowers $l_{L-i}$ of said result C by performing above-described steps in the above-described sequence either until $R_i = 0$ or until a satisfactory level of accuracy of said result C is reached.

* * * * *